US012748879B2

(12) United States Patent
Zhu et al.

(10) Patent No.: US 12,748,879 B2
(45) Date of Patent: Sep. 29, 2026

(54) MULTI-DIMENSIONAL BIOMIMETIC DATA FILE, USAGE METHOD THEREOF, STORAGE MEDIUM AND COMPUTER

(71) Applicant: HANGZHOU LAIBU TECHNOLOGY CO., LTD, Hangzhou (CN)

(72) Inventors: Xiaojun Zhu, Hangzhou (CN); Yanhua Li, Hangzhou (CN)

(73) Assignee: HANGZHOU LAIBU TECHNOLOGY CO., LTD, Hangzhou (CN)

( * ) Notice: Subject to any disclaimer, the term of this patent is extended or adjusted under 35 U.S.C. 154(b) by 83 days.

(21) Appl. No.: 18/931,061

(22) Filed: Oct. 30, 2024

(65) Prior Publication Data

US 2025/0139273 A1 May 1, 2025

(30) Foreign Application Priority Data

Nov. 1, 2023 (CN) ......................... 202311442482.1

(51) Int. Cl.
*G06F 21/62* (2013.01)
*G06F 16/11* (2019.01)
*G06F 21/60* (2013.01)

(52) U.S. Cl.
CPC ........ *G06F 21/6218* (2013.01); *G06F 16/116* (2019.01); *G06F 21/602* (2013.01)

(58) Field of Classification Search
CPC ... G06F 21/6218; G06F 16/116; G06F 21/602
See application file for complete search history.

(56) References Cited

U.S. PATENT DOCUMENTS

2021/0149858 A1* 5/2021 Xia ........................ G06F 16/287
2024/0272992 A1* 8/2024 Zhu ...................... G06F 11/1469

* cited by examiner

*Primary Examiner* — Apu M Mofiz
*Assistant Examiner* — Oscar Wehovz

(57) ABSTRACT

The invention relates to a multi-dimensional biomimetic data file, a usage method thereof, a storage medium and a computer. In the file, the cell membrane data is first dimensional data, the cell nucleus data is second dimensional data, the cytoplasm data is third dimensional data, and the multi-dimensional biomimetic data file is stored in the form of binary stream. The cell membrane data comprises a first beginning position and a first length, a second beginning position and a second length, and a third beginning position and a third length. The cell nucleus data comprises element information, and storage information of the element information. The cytoplasm data comprises data corresponding to element information and file body of multi-dimensional biomimetic data file. The invention can realize hierarchical management of data, parallel reading of data and dynamic adjustment of management information, so that the data file management is more independent and intelligent.

16 Claims, 4 Drawing Sheets

MULTI-DIMENSIONAL BIOMIMETIC DATA FILE, USAGE METHOD THEREOF, STORAGE MEDIUM AND COMPUTER

CROSS REFERENCE TO RELATED APPLICATIONS

The present application claims the benefit of Chinese Patent Application No. 2023114424821 filed on Nov. 1, 2023, the contents of which are incorporated herein by reference in their entirety.

TECHNICAL FIELD

The invention relates to the field of data management, and more specifically, to a multi-dimensional biomimetic data file, a usage method thereof, a storage medium, and a computer.

DESCRIPTION OF RELATED ART

Data security in the information age is very important, but the existing data files generally only contain the official content of the file, that is, the file body, and do not contain file management information, such as txt format files, doc format files, pdf format files, jpg format files, etc. These files only contain the file body, and cannot realize self-management of the data files.

In addition, these files are characterized in that they need to open the file to know the contents of the file, and some meta information (management information) of the file, such as file owner, file permission self-protection, etc., cannot be known in advance, because the file itself does not describe this information.

Although file metadata is added to the file header in the prior art, this method has the following disadvantages: first, the sequential serial reading performance of reading files is not high; Second, when the file meta information changes, it needs to be added or modified, which is inefficient and has poor compatibility; Third, the file data is the original data that can be easily copied away in a secure environment.

BRIEF SUMMARY OF THE INVENTION

A technical problem of the present invention is to provide a multi-dimensional biomimetic data file, a usage method thereof, a storage medium, and a computer.

The technical solution adopted by the present invention is to provide a multi-dimensional biomimetic data file comprising cell membrane data, cell nucleus data and cytoplasm data, wherein the cell membrane data is first dimensional data, the cell nucleus data is second dimensional data, and the cytoplasm data is third dimensional data, and the multi-dimensional biomimetic data file is stored in the form of a binary stream;

- The cell membrane data comprises a first beginning position and a first length corresponding to the cell membrane data, a second beginning position and a second length corresponding to the cell nucleus data, and a third beginning position and a third length corresponding to the cytoplasm data;
- The cell nucleus data comprises element information for managing a file and storage information of the element information in the cytoplasm data;
- The cytoplasm data comprises data corresponding to the element information and the file body of the multi-dimensional biomimetic data file.

Further, in the multi-dimensional biomimetic data file, data corresponding to a preset length portion from the file beginning in the multi-dimensional biomimetic data file is partial data of the cell membrane data, and a first beginning position and a first length corresponding to the cell membrane data are determined from the partial data.

Further, in the multi-dimensional biomimetic data file, the element information is an encryption element for encrypting data; And/or

- The element information is a permission element for file permission management; And/or
- The element information is a transaction element for presenting file transaction information; And/or
- The element information is a DNA element for recording file association information.

In addition, the present invention also provides a usage method of a multi-dimensional biomimetic data file, which is applied to the multi-dimensional biomimetic data file as described above, the method comprising:

- Receiving a file body;
- Converting the file body into the multi-dimensional biomimetic data file according to a preset conversion algorithm;
- Receiving element information and incorporating the element information into the multi-dimensional biomimetic data file.

In addition, the present invention also provides a usage method of a multi-dimensional biomimetic data file, which is applied to the multi-dimensional biomimetic data file as described above, the method comprising:

- Reading the cell membrane data of the multi-dimensional biomimetic data file;
- Obtaining a second beginning position and a second length corresponding to the cell nucleus data, and a third beginning position and a third length corresponding to the cytoplasm data from the cell membrane data;
- Reading the second length from the second beginning position to obtain the cell nucleus data, and reading the third length from the third beginning position to obtain the cytoplasm data;
- Managing the multi-dimensional biomimetic data file according to element information of the cell nucleus data.

Further, in the usage method of a multi-dimensional biomimetic data file according to the present invention, the step of reading the cell membrane data of the multi-dimensional biomimetic data file comprises:

- Reading data corresponding to a preset length portion from the beginning of the file to obtain a first beginning position and a first length corresponding to the cell membrane data;
- Reading the first length from the first beginning position to obtain the cell membrane data.

Further, in the usage method of a multi-dimensional biomimetic data file according to the present invention, the step of managing the multi-dimensional biomimetic data file according to element information of the cell nucleus data comprises:

- Reading content data corresponding to the element information from the cytoplasm data according to stored information of the element information in the cytoplasm data;
- Managing the multi-dimensional biomimetic data file according to the content data of the element information.

Further, in the usage method of a multi-dimensional biomimetic data file according to the present invention, the method further comprises:

Receiving an instruction for adding element, and adding element information corresponding to the instruction for adding element to the cell nucleus data; Or Receiving an instruction for deleting element, and deleting corresponding existing element information in the cell nucleus data according to the instruction for deleting element; Or receiving an instruction for modifying element and modifying existing element information corresponding to the cell nucleus data according to the instruction for modifying element.

Further, the present invention also provides a computer-readable storage medium storing a computer program, the computer program is adapted to be loaded by a processor to perform the steps of the usage method of a multi-dimensional biomimetic data file as described above.

In addition, the present invention also provides a computer comprising a memory and a processor, a computer program is stored in the memory, the processor is used for performing the steps of the usage method of a multi-dimensional biomimetic data file as described above by calling the computer program stored in the memory.

A multi-dimensional biomimetic data file, an usage method thereof, a storage medium, and a computer according to the present invention have the following beneficial effects: the invention utilizes a multi-dimensional biomimetic structure, not only realizes hierarchical management of data, but also realizes parallel reading of data and dynamic adjustment of management information, and makes data file management more independent and intelligent.

BRIEF DESCRIPTION OF THE SEVERAL VIEWS OF THE DRAWINGS

The present invention will be further described below with reference to the accompanying drawings and examples, in which.

DETAILED DESCRIPTION OF THE INVENTION

In order to have a clearer understanding of the technical features, objects and effects of the present invention, specific embodiments of the present invention will now be described in detail with reference to the accompanying drawings.

Figure 1:
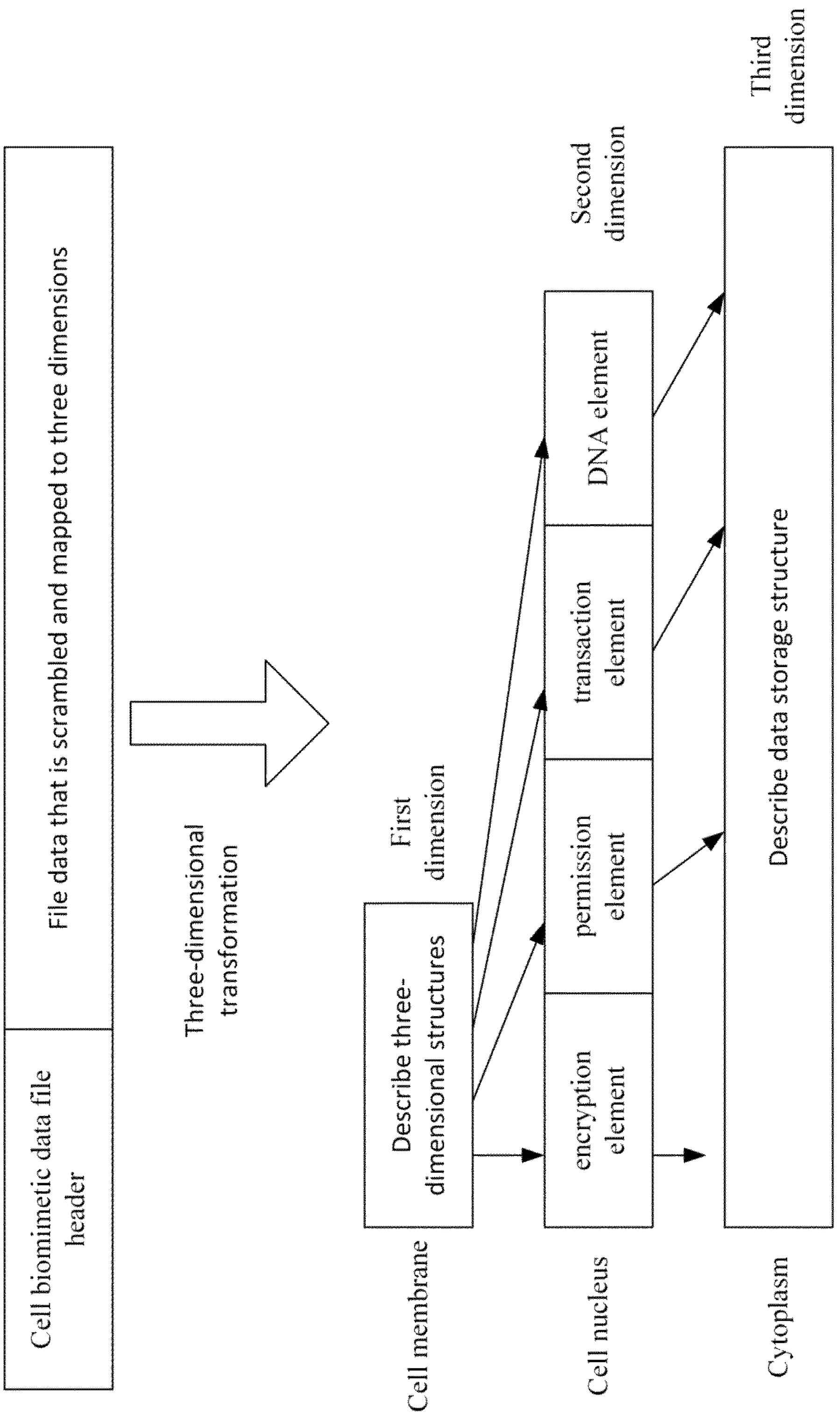
FIG. 1 is a schematic structural diagram of a multi-dimensional biomimetic data file according to an embodiment of the present invention.
Figure 2:
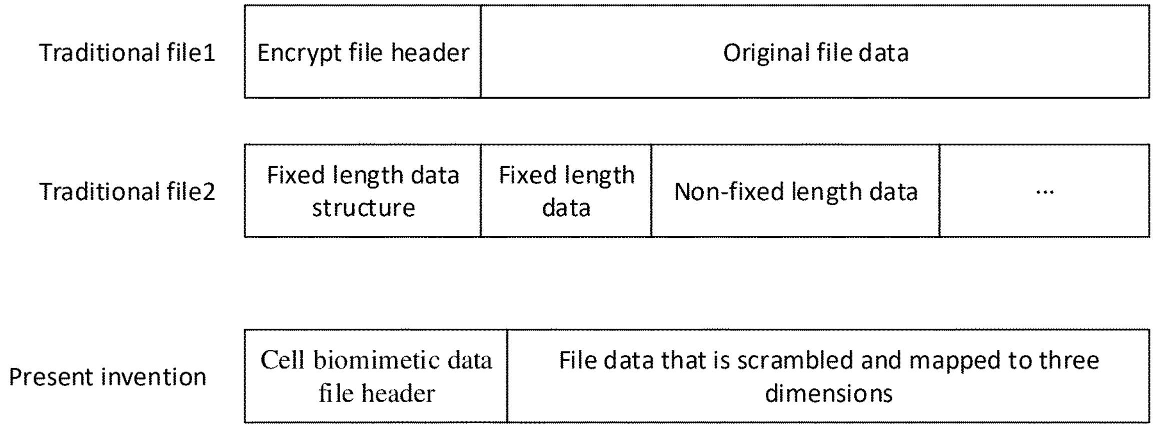
FIG. 2 is a diagram comparing a multi-dimensional biomimetic data file provided by an embodiment of the present invention with a prior art file.

In a preferred embodiment, referring to FIG. 1 and FIG. 2, the multi-dimensional biomimetic data file of the present embodiment comprises cell membrane data, cell nucleus data, and cytoplasm data, the cell membrane data is first dimensional data, the cell nucleus data is second dimensional data, and the cytoplasm data is third dimensional data. The multi-dimensional biomimetic data file is stored in the form of a binary stream, and since the multi-dimensional biomimetic data file of the present embodiment adopts a multi-dimensional design, out-of-order mapping storage can be performed, that is, the multi-dimensional biomimetic data file realizes out-of-order storage, and has higher security than the binary stream stored sequentially in the prior art. Further, different from the sequential storage and sequential reading mechanism of the prior art binary stream file shown in FIG. 2, after the multi-dimensional biomimetic data file of the present embodiment adopts the multi-dimensional structure, it can also realize parallel reading, that is, contents of different dimensions and different positions of the same dimension can be read at the same time, thereby improving the file reading speed. Specifically, the cell membrane data, the cell nucleus data, and the cytoplasm data will be described below, respectively.

The cell membrane data (the first dimensional data) comprises a first beginning position and a first length corresponding to the cell membrane data, a second beginning position and a second length corresponding to the cell nucleus data, and a third beginning position and a third length corresponding to the cytoplasm data. That is, the cell membrane data is obtained by reading the first length from the first beginning position of the file, the cell nucleus data is obtained by reading the second length from the second beginning position of the file, and the cytoplasm data is obtained by reading the third length from the third beginning position of the file. It can be seen that the cell membrane data (the first dimensional data) is only used to determine the storage location of cell membrane data, cell nucleus data and cytoplasm data. It is not the file body, but the content that can be obtained before opening the file body.

The cell nucleus data (the second dimensional data) comprises element information for managing the file and storage information of the element information in the cytoplasm data. It should be noted that the element information is information for managing a file, not a file body of a multi-dimensional biomimetic data file. Therefore, as compared with the prior art, the present embodiment can incorporate the element information used for managing the file into the file itself and form an organic whole with the file, thereby no longer relying on an external platform to manage data, and makes the management of the data file more independent and intelligent. Alternatively, the cell nucleus data may comprise one or more pieces of element information, and the element information may be added, deleted, and modified as needed, that is, new element information may be added to the cell nucleus data, existing element information may be deleted, or existing element information may be modified, thereby realizing flexible management of the file.

Further, data information corresponding to each element information in the cell nucleus data is stored in the cytoplasm portion, and when a certain element information is acquired, storage information of the element information in the cytoplasm data is first acquired from the cell nucleus data, and then data information corresponding to the element information is acquired from the cytoplasm data according to the storage information. By comparing the multi-dimensional biomimetic data file of the present embodiment with the prior art file in FIG. 1 and FIG. 2, it can be seen that the prior art file of FIG. 2 only contains the file body but not management information, so self-management of the data file cannot be realized, while the present embodiment is a multi-dimensional file design, and the element information is stored by setting cell nucleus data, thereby realizing self-management of the file.

The cytoplasm data (the third dimensional data) comprises data corresponding to the element information and a file body of a multi-dimensional biomimetic data file, where the file body of the multi-dimensional biomimetic data file refers to the official content portion of the file in the entire file. It should be noted that the multi-dimensional biomimetic data file of the present embodiment comprises management information and file body, wherein the management information is used for managing the file, that is, managing the file body; The file body is the official content part of the file. For example, the file body may be a txt format file, a doc format file, a pdf format file, a jpg format file, or the like. The element information refers to management information for managing the document text, for example, an encryption element, a permission element, a transaction element, a DNA element, and the like, and the management of the file body can be achieved by utilizing this essential information.

Further, since the multi-dimensional biomimetic data file of the present embodiment adopts a multi-dimensional structure and multi-dimensional storage, when reading data, it is possible to first read element information in cell membrane data and cytoplasm data, and then use the file body in cytoplasm data according to management information comprised in the element information, thereby realizing hierarchical reading and file management. As can be seen, compared with the prior art in which a file needs to be opened to know the file content, the present embodiment can first read the element information on the premise that the file body is not opened, and then determine whether it is necessary to open the file body according to the element information and other management operations.

To sum up, the present embodiment uses a multi-dimensional biomimetic structure, which not only realizes hierarchical management of data, but also realizes parallel reading of data and dynamic adjustment of management information, and makes data file management more independent and intelligent.

In the multi-dimensional biomimetic data file of some embodiments, considering that the cell membrane data length of each multi-dimensional biomimetic data file is not the same, the length of the cell membrane data in the binary stream file cannot be directly known when the cell membrane data is read, so this embodiment first sets a preset length, and the data corresponding to the portion from the beginning of the file to the preset length in the multi-dimensional biomimetic data file is partial data of the cell membrane data, and the first beginning position and the first length corresponding to the cell membrane data are determined from the partial data. In this embodiment, by setting the preset length data, partial data of the cell membrane data is first obtained, and then all the cell membrane data is obtained according to the partial data.

In the multi-dimensional biomimetic data file according to some embodiments, the element information is an encryption element used for encrypting data, and the encryption element is used for encrypting and decrypting the multi-dimensional biomimetic data file. Specific algorithms used for encryption and decryption can refer to the prior art. In the process of generating the multi-dimensional biomimetic data file, the multi-dimensional biomimetic data file is encrypted by utilizing the encryption element; In the process of reading and using the multi-dimensional biomimetic data file, the encryption element is used for decrypting the multi-dimensional biomimetic data file. Alternatively, the encryption element may be used specifically for encrypting and decrypting of the file body, that is, the encryption element is used for encrypting the file body during the multi-dimensional biomimetic data file generation process; In the process of reading and using multi-dimensional biomimetic data files, the encryption elements are used for decrypting the file body. In this embodiment, the encryption and decryption of the multi-dimensional biomimetic data file are realized by the encryption element in the cell nucleus data, and the encryption and decrypting management of the multi-dimensional biomimetic data file are realized, and the encryption management is also the embodiment of self-management of the multi-dimensional biomimetic data file.

In the multi-dimensional biomimetic data file of some embodiments, the element information is a permission element for file permission management. The permission element is used for managing the permission to use the multi-dimensional biomimetic data file, such as whether the user has the authority to use the multi-dimensional biomimetic data file, the total time for the user to use the multi-dimensional biomimetic data file, the time for the user to use the multi-dimensional biomimetic data file, the proportion for the user to use the multi-dimensional biomimetic data file, etc. The present embodiment realizes the use permission management of the multi-dimensional biomimetic data file by the permission element in the cell nucleus data, and the permission management is also the embodiment of self-management of the multi-dimensional biomimetic data file.

In the multi-dimensional biomimetic data file of some embodiments, the element information is a transaction element used for presenting file transaction information, and the transaction element is transaction information referring to data used for a standard transaction, such as a standard trading code for data trading. That is, the transaction element of the present embodiment comprises transaction information for data trading, and the transaction element corresponds to the file body in the multi-dimensional biomimetic data file, and the data trading can be realized by using the transaction element when data is transacted. In the present embodiment, data trading of the multi-dimensional biomimetic data file is realized by the transaction element in the cell nucleus data, and the transaction process is also an embodiment of self-management of the multi-dimensional biomimetic data file.

In the multi-dimensional biomimetic data file of some embodiments, the element information is a DNA element for recording file association information, and the DNA element comprises information associated with the multi-dimensional biomimetic data file, such as a generation source, a transmission path, and other information of the multi-dimensional biomimetic data file.

Figure 3:
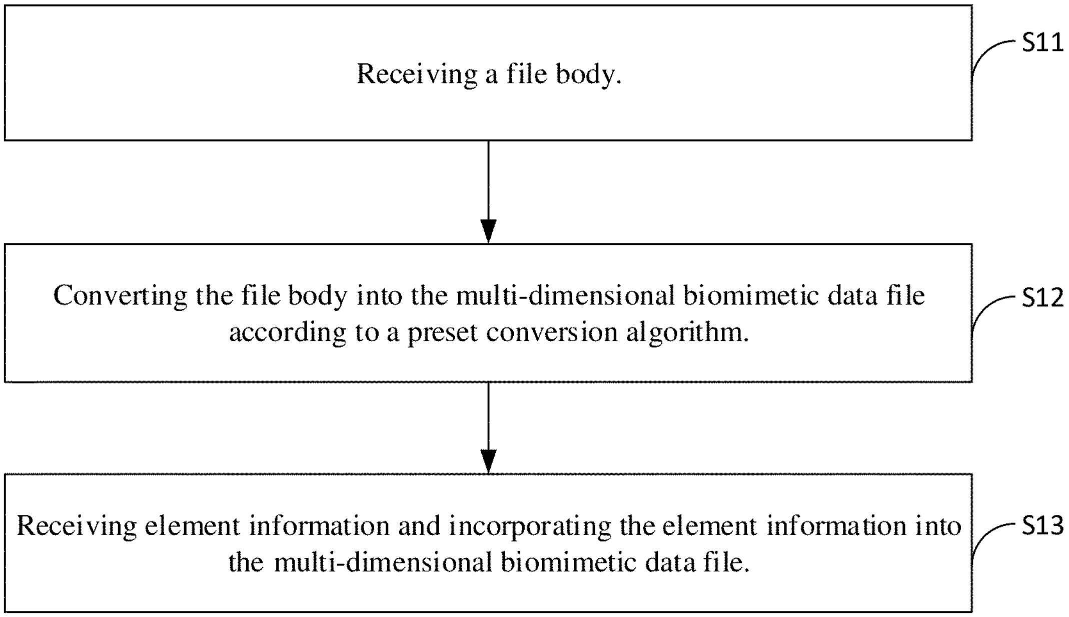
FIG. 3 is a flowchart of a usage method of a multi-dimensional biomimetic data file according to an embodiment of the present invention.

In a preferred embodiment, the usage method of the multi-dimensional biomimetic data file of the present embodiment is applied to the multi-dimensional biomimetic data file as in the above-described embodiment, in particular, the method of generating the multi-dimensional biomimetic data file is used for generating the multi-dimensional biomimetic data file of the above-described embodiment. Referring to FIG. 3, the usage method of a multi-dimensional biomimetic data file comprises the following steps:

Step S11: Receiving a file body.

Specifically, the file body is data containing certain information, that is, a data collection stored in a certain format, for example, the file body may be a txt format file, a doc format file, a pdf format file, a jpg format file, or the like.

Step S12: Converting the file body into a multi-dimensional biomimetic data file according to a preset conversion algorithm.

Specifically, the present embodiment provides a preset conversion algorithm, and by using this preset conversion algorithm, the file body can be converted into a multi-dimensional biomimetic data file as in the above embodiment, that is, the generated multi-dimensional biomimetic data file comprises cell membrane data, cell nucleus data, and cytoplasm data, the cell membrane data is first dimensional data, the cell nucleus data is second dimensional data, and the cytoplasm data is third dimensional data. And the cell membrane data comprises a first beginning position and a first length corresponding to the cell membrane data, a second beginning position and a second length corresponding to the cell nucleus data, and a third beginning position and a third length corresponding to the cytoplasm data.

Step S13: Receiving element information and incorporating the element information into the multi-dimensional biomimetic data file.

Specifically, after the multi-dimensional biomimetic data file is initially generated, it is necessary to input element information into the multi-dimensional biomimetic data file. The multi-dimensional biomimetic data file receives the element information and incorporates the element information into the multi-dimensional biomimetic data file. That is, the element information is incorporated into the cell nucleus data and the cytoplasm data of the multi-dimensional biomimetic data file.

The present embodiment provides a generation method for a multi-dimensional biomimetic data file, and by the method, new data or existing data can be quickly converted into a multi-dimensional biomimetic data file, so that the data has a self-management function and data intelligence can be realized.

Figure 4:
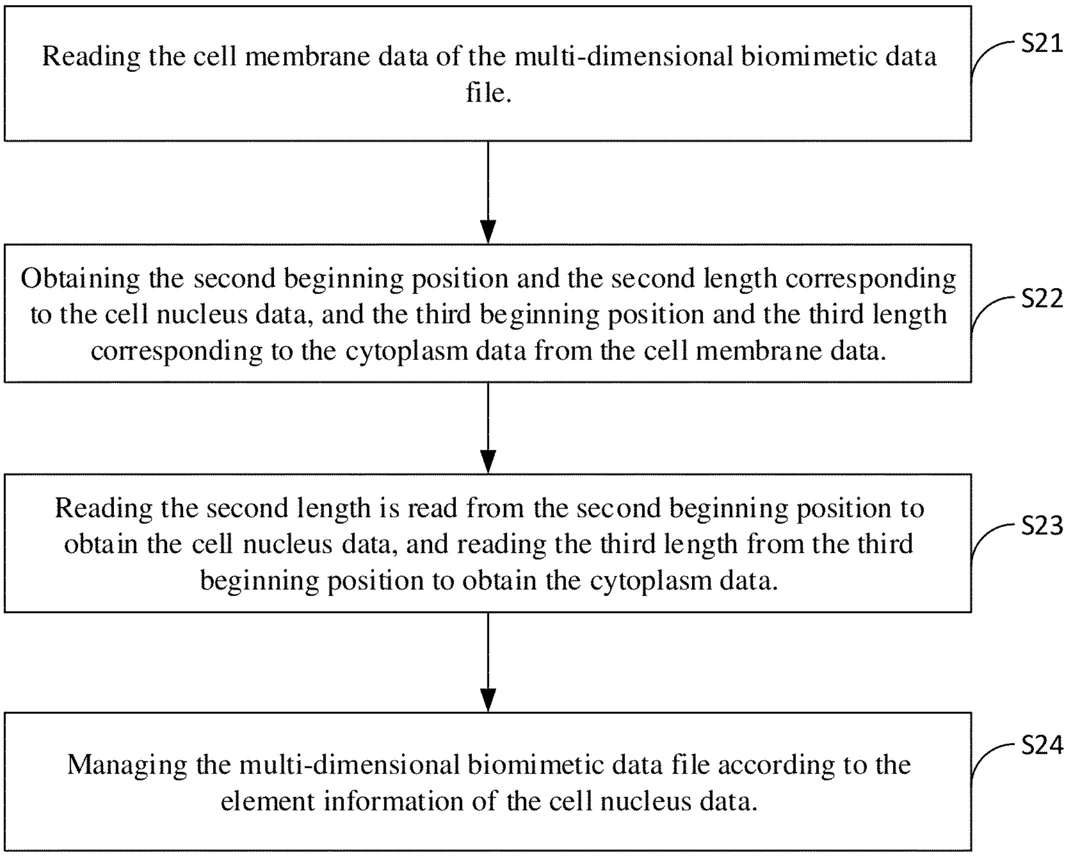
FIG. 4 is a flowchart of a usage method of a multi-dimensional biomimetic data file according to an embodiment of the present invention.

In a preferred embodiment, the usage method of a multi-dimensional biomimetic data file of the present embodiment is applied to the multi-dimensional biomimetic data file as in the above-described embodiment. The usage method of a multi-dimensional biomimetic data file is used for reading and using the multi-dimensional biomimetic data file of the above-described embodiment. Refer to FIG. 4, the usage method of a multi-dimensional biomimetic data file comprises the following steps:

Step S21: Reading the cell membrane data of the multi-dimensional biomimetic data file.

Specifically, the multi-dimensional biomimetic data file of the present embodiment adopts a multi-dimensional structure design, each dimension has its own information, and each dimension is progressively managed to form an organic whole. Therefore, when reading the multi-dimensional biomimetic data file, data corresponding to the preset length portion from the beginning of the file is first read, the data corresponding to the preset length portion is partial data of the cell membrane data, and the first beginning position and the first length corresponding to the cell membrane data are obtained from the data corresponding to the preset length portion. Then reading the first length from the first beginning position from the multi-dimensional biomimetic data file to obtain the cell membrane data, and the obtained cell membrane data at this time is all the data of the cell membrane data.

Step S22: Obtaining the second beginning position and the second length corresponding to the cell nucleus data, and the third beginning position and the third length corresponding to the cytoplasm data from the cell membrane data.

Specifically, the multi-dimensional biomimetic data file is stored in the form of a binary stream, and after the cell membrane data is obtained, the second beginning position and the second length corresponding to the cell nucleus data, and the third beginning position and the third length corresponding to the cytoplasm data are obtained from the cell membrane data.

Step S23: Reading the second length is read from the second beginning position to obtain the cell nucleus data, and reading the third length from the third beginning position to obtain the cytoplasm data.

Specifically, the multi-dimensional biomimetic data file is stored in the form of a binary stream, and when it is necessary to read the cell nucleus data, the cell nucleus data can be obtained by reading the second length from the second beginning position of the binary stream of the multi-dimensional biomimetic data. When the cytoplasm data needs to be read, the cytoplasm data can be obtained by reading the third length from the third beginning position of the binary stream of the multi-dimensional biomimetic data.

Step S24: Managing the multi-dimensional biomimetic data file according to the element information of the cell nucleus data.

Specifically, when managing a multi-dimensional biomimetic data file, it is necessary to obtain element information of the cell nucleus data, and the element information is recorded in the cell nucleus data, but the content data corresponding to the element information is stored in the cytoplasm data, so it is necessary to read the content data corresponding to the element information from the cytoplasm data according to the storage information of the element information in the cytoplasm data.

Further, the multi-dimensional biomimetic data file is managed on the basis of the content data of the element information. More specifically, the file body of the multi-dimensional biomimetic data file is managed on the basis of the content data of the element information.

For example, the element information is an encryption element for encrypting data, and the encryption element is used for encrypting and decrypting the multi-dimensional biomimetic data file. In the process of reading and using the multi-dimensional biomimetic data file, the encryption element is used for decrypting the multi-dimensional biomimetic data file. Alternatively, the encryption element may be used specifically for encrypting and decrypting the file body, that is, the encryption element is used for encrypting the file body during the multi-dimensional biomimetic data file generation process; In the process of reading and using multi-dimensional biomimetic data files, the encryption elements are used for decrypting the file body.

For example, the element information is a permission element for file permission management. The permission element is used for managing the permission to use the multi-dimensional biomimetic data file, such as whether the user has the authority to use the multi-dimensional biomimetic data file, the total time for the user to use the multi-dimensional biomimetic data file, the time for the user to use the multi-dimensional biomimetic data file, the proportion for the user to use the multi-dimensional biomimetic data file, etc.

For example, the element information is a transaction element for presenting file transaction information, The transaction element refers to the transaction information used for a standard trading, such as a data trading standard trading code. That is, the transaction element of the present embodiment comprises transaction information for data trading, and the transaction element corresponds to the file body in the multi-dimensional biomimetic data file, and the data trading can be realized by using the transaction element when data is transacted.

This embodiment provides a usage method of a multi-dimensional biomimetic data file, and it can be seen that the multi-dimensional biomimetic data file can first open cell membrane data and cytoplasm data without opening the file body. On the other hand, the multi-dimensional biomimetic data file itself carries element information, which can realize self-management without relying on the external environment, and improve data independence and intelligence.

Figure 5:
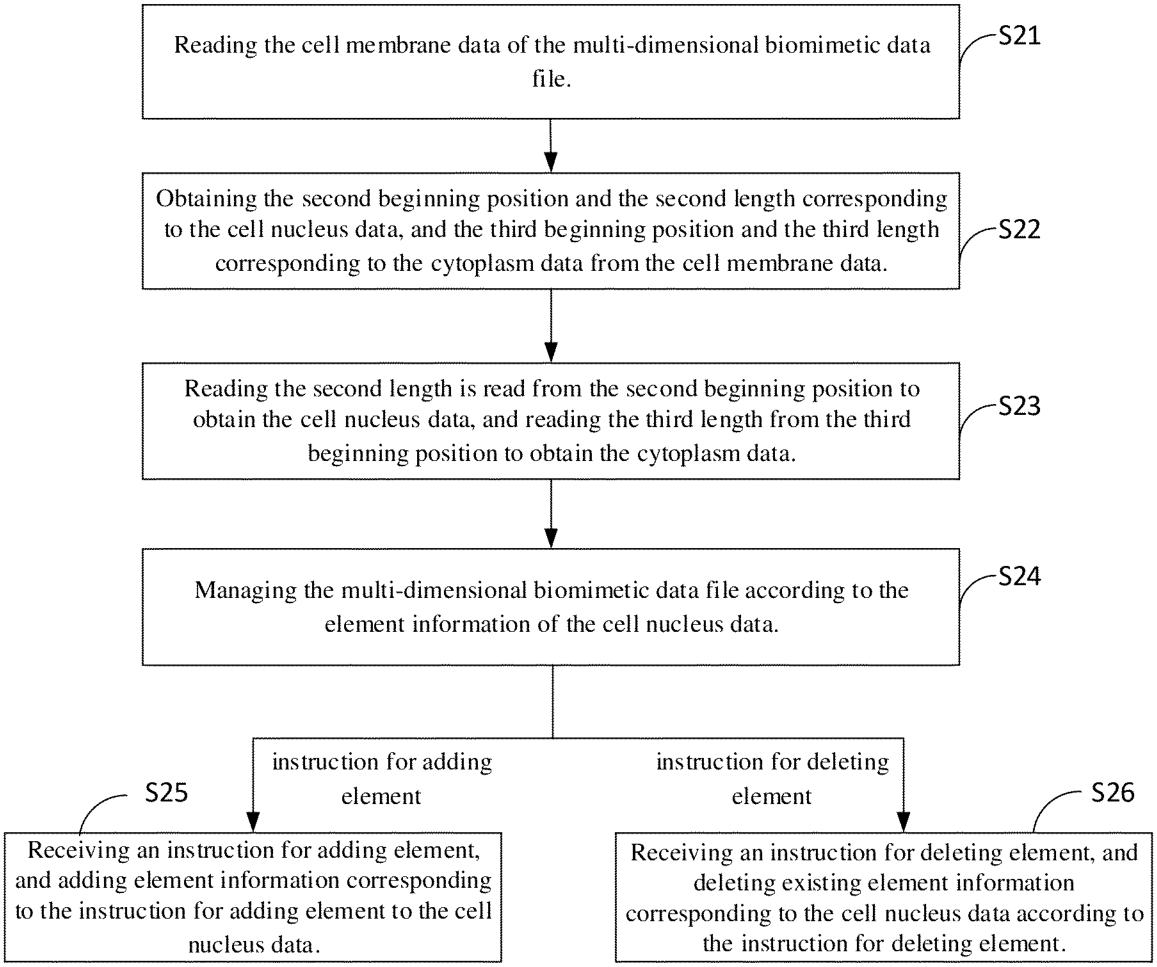
FIG. 5 is a flowchart of a usage method of a multi-dimensional biomimetic data file according to an embodiment of the present invention.

In the usage method of a multi-dimensional biomimetic data file according to some embodiments, referring to FIG. 5, after step S24 of the above-described embodiment, the steps are further comprised:

Step S25: Receiving an instruction for adding element, and adding element information corresponding to the instruction for adding element to the cell nucleus data.

Specifically, the multi-dimensional biomimetic data file of the present embodiment sets special cell nucleus data for storing element information, and since the cell membrane data, the cell nucleus data, and the cytoplasm data in the multi-dimensional biomimetic data file are divided into three independent dimensions, the cell nucleus data has independent editing capabilities, and the element information in the cell nucleus data can be flexibly adjusted according to data management requirements.

Accordingly, when it is necessary to add file management information to the multi-dimensional biomimetic data file, that is, to add element information having a file management function, the user inputs the element information and a corresponding instruction for adding element to the multi-dimensional biomimetic data file. After receiving the instruction for adding element, the multi-dimensional biomimetic data file adds the element information corresponding to the instruction for adding element to the cell nucleus data to complete the addition of the element information of the multi-dimensional biomimetic data file.

The method for adding element information to a multi-dimensional biomimetic data file provided by the present embodiment not only can satisfy the demand for adding management information to a multi-dimensional biomimetic data file, but also the adding process does not affect the entire file structure, thereby making file management more convenient.

In the usage method of a multi-dimensional biomimetic data file according to some embodiments, referring to FIG. 5, after step S24 of the above-described embodiment, the steps are further comprised:

Step S26: Receiving an instruction for deleting element, and deleting existing element information corresponding to the cell nucleus data according to the instruction for deleting element.

Specifically, the multi-dimensional biomimetic data file of the present embodiment sets special cell nucleus data for storing element information, and since the cell membrane data, the cell nucleus data, and the cytoplasm data in the multi-dimensional biomimetic data file are divided into three independent dimensions, the cell nucleus data has independent editing capabilities, and the element information in the cell nucleus data can be flexibly adjusted according to data management requirements.

Accordingly, when it is necessary to reduce the file management information in the multi-dimensional biomimetic data file, that is, to reduce the file management function, the user inputs an instruction for deleting element to the multi-dimensional biomimetic data file. After receiving the instruction for deleting element, the multi-dimensional biomimetic data file deletes the existing element information corresponding to the cell nucleus data according to the instruction for deleting element.

The method for deleting element information of a multi-dimensional biomimetic data file provided by the present embodiment not only satisfies the demand for adding management information to a multi-dimensional biomimetic data file, but also the deleting process does not affect the entire file structure, thereby making file management more convenient.

In the usage method of a multi-dimensional biomimetic data file according to some embodiments, after step S24 in the above embodiment, further steps are comprised:

Receiving an instruction for modifying element and modifying existing element information corresponding to the cell nucleus data according to the instruction for modifying element. It can be understood that when the user inputs an instruction for modifying element, the element information to be modified and the content to be modified should be specified simultaneously. After the multi-dimensional biomimetic data file receives the instruction for modifying element, the corresponding element information is modified according to the modification content of the received instruction for modifying element, thereby completing the modification of the existing element information in the multi-dimensional biomimetic data file.

The method for modifying element information of a multi-dimensional biomimetic data file provided by the present embodiment not only can satisfy the demand for adding management information to a multi-dimensional biomimetic data file, but also the modification process does not affect the entire file structure, thereby making file management more convenient.

In a preferred embodiment, the computer-readable storage medium of the present embodiment stores a computer program, and the computer program is adapted to be loaded by a processor to perform the steps of the usage method of a multi-dimensional biomimetic data file as in the above-described embodiment.

In a preferred embodiment, the computer of the present embodiment comprises a memory storing a computer program in the memory and a processor, and the processor performs the steps of the usage method of a multi-dimensional biomimetic data file as in the above embodiment by calling the computer program stored in the memory.

In the present specification, each embodiment is described in a progressive manner, and the differences between each embodiment and other embodiments are emphasized, and the same and similar parts between each embodiment can be referred to each other. As for the apparatus disclosed in the embodiment, since the apparatus corresponds to the method disclosed in the embodiment, the description is relatively simple, and the description of the method section can be referred to for related details.

Those skilled in the art may further appreciate that the elements and algorithmic steps of the examples described in connection with the embodiments disclosed herein can be implemented in electronic hardware, computer software, or a combination of both, and in order to clearly illustrate the interchangeability of hardware and software, the components and steps of the examples have been described generally in terms of functionality in the foregoing description. Whether these functions are performed in hardware or software depends on the specific application and design constraints of the technical solution. Those skilled in the art may use different methods for implementing the described functions for each particular application, but such implementations should not be considered beyond the scope of the present invention. T The steps of the methods or algorithms described in connection with the embodiments disclosed herein may be implemented directly in hardware, a processor-executed software module, or a combination of both. The software module may be placed in random access memory (RAM), memory, read-only memory (ROM), electrically programmable ROM, electrically erasable programmable ROM, registers, hard disk, removable magnetic disk, CD-ROM, or any other form of storage medium known in the art.

The above embodiments are merely for illustrating the technical concept and features of the present invention, and are intended to enable those skilled in the art to understand the contents of the present invention and carry out the present invention accordingly, and do not limit the scope of protection of the present invention. All changes and modifications equivalent to the scope of the claims of the present invention should fall within the scope of the claims of the present invention.

What is claimed is:

1. A usage method applied to a multi-dimensional biomimetic data file, the method comprising:

receiving a file body;

converting the file body into the multi-dimensional biomimetic data file according to a preset conversion algorithm;

receiving element information and incorporating the element information into the multi-dimensional biomimetic data file;

wherein the multi-dimensional biomimetic data file comprising cell membrane data, cell nucleus data, and cytoplasm data, wherein the cell membrane data is first dimensional data, the cell nucleus data is second dimensional data, and the cytoplasm data is third dimensional data, and the multi-dimensional biomimetic data file is stored in the form of a binary stream;

the cell membrane data comprises a first beginning position and a first length corresponding to the cell membrane data, a second beginning position and a second length corresponding to the cell nucleus data, and a third beginning position and a third length corresponding to the cytoplasm data;

the cell nucleus data comprises element information for managing a file and storage information of the element information in the cytoplasm data;

the cytoplasm data comprises data corresponding to the element information and a file body of the multi-dimensional biomimetic data file.

2. The usage method according to claim 1, wherein data corresponding to a preset length portion from the file beginning in the multi-dimensional biomimetic data file is partial data of the cell membrane data, and the first beginning position and the first length corresponding to the cell membrane data are determined by the partial data.

3. The usage method according to claim 1, wherein the element information is an encryption element for encrypting data; and/or the element information is a permission element for file permission management; and/or the element information is a transaction element for presenting document transaction information; and/or the element information is a DNA element for recording file association information.

4. A computer-readable storage medium, wherein the computer-readable storage medium stores a computer program, the computer program is adapted to be loaded by a processor for performing the steps of the usage method as claimed in claim 1.

5. A computer comprising a memory having a computer program stored therein and a processor, the processor is used for performing the steps of the usage method according to claim 1 by calling the computer program stored therein.

6. A usage method applied to a multi-dimensional biomimetic data file, the method comprising:

reading cell membrane data of the multi-dimensional biomimetic data file;

obtaining a second beginning position and a second length corresponding to cell nucleus data, and a third beginning position and a third length corresponding to cytoplasm data from the cell membrane data;

reading the second length from the second beginning position to obtain the cell nucleus data, and reading the third length from the third beginning position to obtain the cytoplasm data;

managing the multi-dimensional biomimetic data file according to element information of the cell nucleus data;

wherein the multi-dimensional biomimetic data file comprising cell membrane data, cell nucleus data, and cytoplasm data, wherein the cell membrane data is first dimensional data, the cell nucleus data is second dimensional data, and the cytoplasm data is third dimensional data, and the multi-dimensional biomimetic data file is stored in the form of a binary stream;

the cell membrane data comprises a first beginning position and a first length corresponding to the cell membrane data, a second beginning position and a second length corresponding to the cell nucleus data, and a third beginning position and a third length corresponding to the cytoplasm data;

the cell nucleus data comprises the element information for managing a file and storage information of the element information in the cytoplasm data;

the cytoplasm data comprises data corresponding to the element information and a file body of the multi-dimensional biomimetic data file.

7. The usage method according to claim 6, wherein the step of reading cell membrane data of the multi-dimensional biomimetic data file comprises:

reading data corresponding to a preset length portion from the beginning of the file to obtain the first beginning position and the first length corresponding to the cell membrane data;

reading the first length from the first beginning position to obtain the cell membrane data.

8. The usage method according to claim 6, wherein the step of managing the multi-dimensional biomimetic data file according to element information of the cell nucleus data comprises:

reading content data corresponding to the element information from the cytoplasm data according to stored information of the element information in the cytoplasm data;

managing the multi-dimensional biomimetic data file according to the content data of the element information.

9. The usage method according to claim 6, further comprising:

receiving an instruction for adding element, and adding element information corresponding to the instruction for adding element to the cell nucleus data; or receiving an instruction for deleting element, and deleting corresponding existing element information in the cell nucleus data according to the instruction for deleting element; or receiving an instruction for modifying element and modifying existing element information corresponding to the cell nucleus data according to the instruction for modifying element.

10. The usage method according to claim 6, wherein data corresponding to a preset length portion from the file beginning in the multi-dimensional biomimetic data file is partial data of the cell membrane data, and the first beginning position and the first length corresponding to the cell membrane data are determined by the partial data.

11. The usage method according to claim 6, wherein the element information is an encryption element for encrypting data; and/or the element information is a permission element for file permission management; and/or the element information is a transaction element for presenting document transaction information; and/or the element information is a DNA element for recording file association information.

12. A computer-readable storage medium, wherein the computer-readable storage medium stores a computer program, the computer program is adapted to be loaded by a processor for performing the steps of the usage method as claimed in claim 6.

13. A computer comprising a memory having a computer program stored therein and a processor, the processor is used for performing the steps of the usage method according to claim 6 by calling the computer program stored therein.

14. The usage method according to claim 10, wherein the element information is an encryption element for encrypting data; and/or the element information is a permission element for file permission management; and/or the element information is a transaction element for presenting document transaction information; and/or the element information is a DNA element for recording file association information.

15. The usage method according to claim 10, further comprising:

receiving an instruction for adding element, and adding element information corresponding to the instruction for adding element to the cell nucleus data; or receiving an instruction for deleting element, and deleting corresponding existing element information in the cell nucleus data according to the instruction for deleting element; or receiving an instruction for modifying element and modifying existing element information corresponding to the cell nucleus data according to the instruction for modifying element.

16. The usage method according to claim 11, wherein the step of reading cell membrane data of the multi-dimensional biomimetic data file comprises:

reading data corresponding to a preset length portion from the beginning of the file to obtain the first beginning position and the first length corresponding to the cell membrane data;

reading the first length from the first beginning position to obtain the cell membrane data.

* * * * *